United States Patent
Scaramucci et al.

(10) Patent No.: US 12,021,372 B2
(45) Date of Patent: Jun. 25, 2024

(54) POWER SUPPLY SYSTEM WITH PROTECTION AGAINST CURRENT VARIATIONS

(71) Applicant: ELDOR CORPORATION S.P.A., Orsenigo (IT)

(72) Inventors: Ciro Scaramucci, Orsenigo (IT); Pasquale Forte, Orsenigo (IT)

(73) Assignee: ELDOR CORPORATION S.P.A., Orsenigo (IT)

( * ) Notice: Subject to any disclaimer, the term of this patent is extended or adjusted under 35 U.S.C. 154(b) by 148 days.

(21) Appl. No.: 17/597,832

(22) PCT Filed: Jul. 24, 2020

(86) PCT No.: PCT/IB2020/057011
§ 371 (c)(1),
(2) Date: Jan. 25, 2022

(87) PCT Pub. No.: WO2021/019399
PCT Pub. Date: Feb. 4, 2021

(65) Prior Publication Data
US 2022/0278524 A1 Sep. 1, 2022

(30) Foreign Application Priority Data
Jul. 26, 2019 (IT) .......................... 102019000013065

(51) Int. Cl.
*H02H 7/20* (2006.01)
*B60L 3/00* (2019.01)
*H02H 1/00* (2006.01)
(52) U.S. Cl.
CPC ............. *H02H 7/20* (2013.01); *B60L 3/0046* (2013.01); *H02H 1/0007* (2013.01); *B60L 2240/549* (2013.01)

(58) Field of Classification Search
CPC .. B60L 2240/549; B60L 3/0046; B60R 16/03; B60R 16/033; G01R 1/20;
(Continued)

(56) References Cited

U.S. PATENT DOCUMENTS

| 7,737,582 B2 * | 6/2010 | Jabaji ...................... B60R 16/03 307/126 |
| 8,558,712 B2 * | 10/2013 | Fechalos ............. H02J 7/00309 702/63 |

(Continued)

FOREIGN PATENT DOCUMENTS

| GB | 1414985 A * | 11/1975 | ......... G01R 19/0023 |
| JP | 6268870 B2 | 1/2018 | |
| JP | 2018083488 A | 5/2018 | |

OTHER PUBLICATIONS

International Search Report and Written Opinion, European International Search Authority, mailed Nov. 13, 2020, for PCT/IB2020/057011 filed Jul. 24, 2020.

*Primary Examiner* — Jared Fureman
*Assistant Examiner* — Nicolas Bellido
(74) *Attorney, Agent, or Firm* — Workman Nydegger

(57) ABSTRACT

A power supply system includes a power supply circuit, a sensor of the current flowing through a terminal of the power supply circuit and a protection circuit. The protection circuit includes a differentiator adapted to measure a slope of a current measurement signal and comprises a driving stage. The power supply circuit is configured to receive a disconnection signal and, alternatively, to electrically connect the internal components thereof to its terminal or electrically disconnect the internal components thereof from its terminal, as a function of the value of the disconnection signal.

20 Claims, 5 Drawing Sheets

(58) Field of Classification Search
CPC .. G01R 19/12; G01R 31/3828; H02H 1/0007; H02H 3/06; H02H 3/087; H02H 3/445; H02H 7/1213; H02H 7/20; H02J 2310/48; H02J 7/0031; H02J 7/32; H02M 3/158
See application file for complete search history.

(56) References Cited

U.S. PATENT DOCUMENTS

| | | | |
|---|---|---|---|
| 9,806,617 B1* | 10/2017 | Ozawa | H02M 3/1588 |
| 9,837,888 B2* | 12/2017 | Yamakawa | H02M 1/14 |
| 2008/0315683 A1 | 12/2008 | Jabaji et al. | |
| 2016/0241133 A1* | 8/2016 | Yamakawa | H02M 3/158 |

* cited by examiner

POWER SUPPLY SYSTEM WITH PROTECTION AGAINST CURRENT VARIATIONS

TECHNICAL FIELD OF THE INVENTION

The present invention relates in general to the electronics field.

More in particular, the present invention concerns a power supply system equipped with an electronic circuit for the protection of a power supply circuit of the same system, in case of a sudden variation in the current at the input of the same power supply circuit.

PRIOR ART

In the automotive field, direct-direct voltage converters (DC-DC) are used (in hybrid or electric vehicles) connected on one side to a high voltage battery (e.g., 400 V) to power the electric motor of the vehicle and on the other side to a low voltage battery (e.g., 12 V) to power the electrical services in the passenger compartment of the same vehicle.

Therefore the DC-DC converter operates bidirectionally so as to supply both the low voltage side and the high voltage side.

DC-DC converter protection circuits are known, in case of input overcurrents to the DC-DC converter, i.e. peak current values which are too high.

Situations may also occur in which there is a sudden variation in the current at the input of the DC-DC converter, for example on the low voltage side in case several electrical/electronic devices are switched on at the same time, or in case of a battery fault on the low or high voltage side, or in case of a fault in an electrical component of the vehicle: in this case it is necessary to protect the DC-DC converter from this sudden variation in its input current, in order to prevent damage to the DC-DC converter itself.

The Applicant has observed that the known overcurrent protection circuits do not allow to detect the situation in which there is a sudden variation in the current at the input of the DC-DC converter with sufficient reliability and speed, thus increasing the risk of damaging it.

BRIEF SUMMARY OF THE INVENTION

The present invention relates to a power supply system with protection against sudden variations in the input current.

The basic idea is to use a protection circuit with a differentiator capable of detecting a sudden variation in the current at the input of the power supply circuit, then promptly disconnecting the power supply circuit from the side where the sudden current variation occurred.

The Applicant has perceived that the power supply system according to the present invention allows a sudden variation of the current at the input of a power supply circuit to be detected in a reduced amount of time and reliably, regardless of the absolute value of the input current.

It is also an object of the present invention a vehicle with an electric motor or a hybrid vehicle with a thermal/electric motor.

BRIEF DESCRIPTION OF THE DRAWINGS

Additional features and advantages of the invention will become more apparent from the description which follows of a preferred embodiment and its variants, provided by way of example with reference to the appended drawings, in which.

DETAILED DESCRIPTION OF THE INVENTION

It should be observed that in the following description, identical or analogous blocks, components or modules are indicated in the figures with the same numerical references, even where they are illustrated in different embodiments of the invention.

Figure 1A:
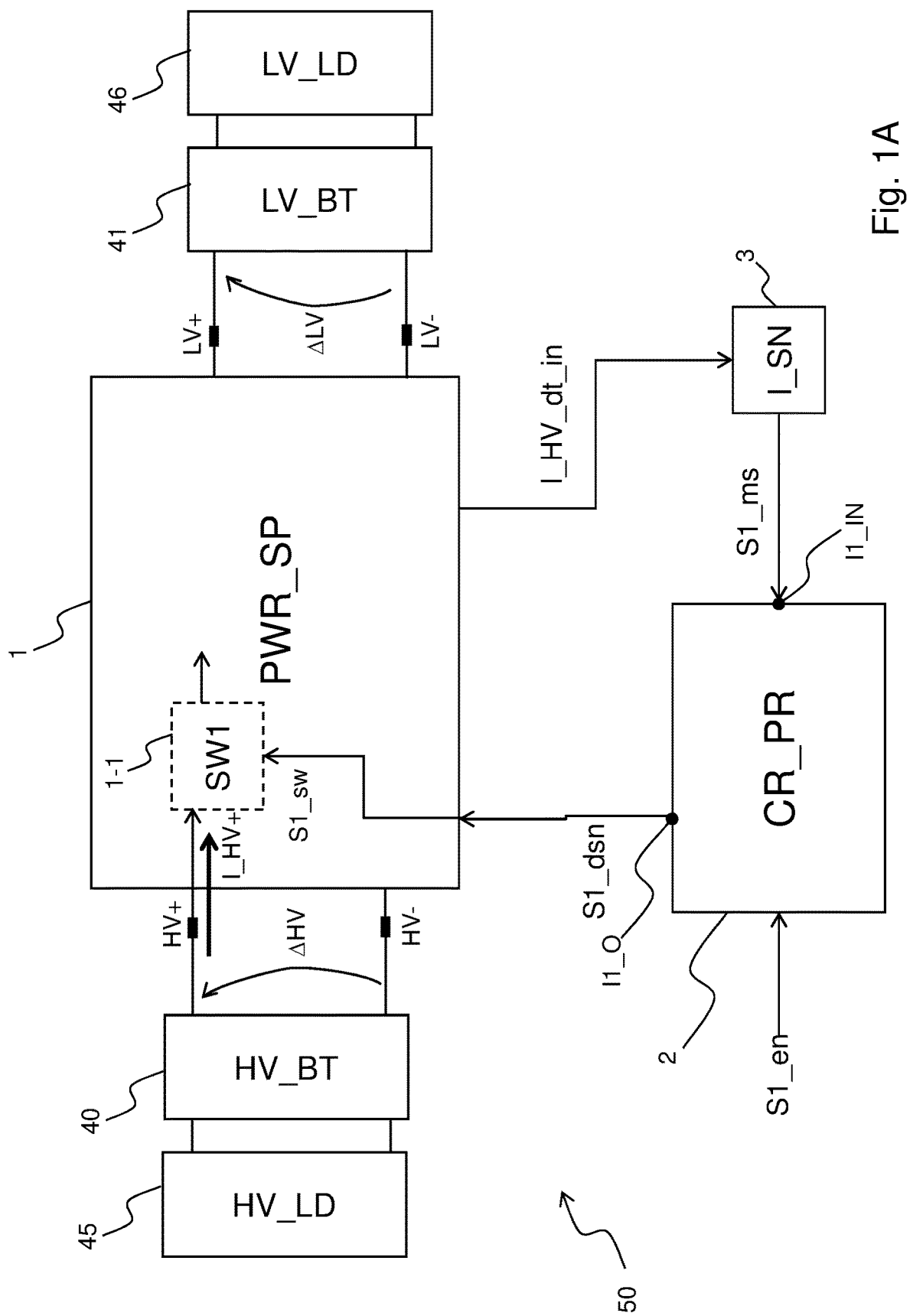
FIG. 1A shows a block diagram of a power supply system according to a first embodiment of the invention.

With reference to FIG. 1A, it shows a block diagram of a power supply system 50 according to a first embodiment of the invention.

The power supply system 50 comprises a power supply circuit 1, a first battery 40, a first load 45, a second battery 41, a second load 46, a current sensor 3 and a protection circuit 2.

The power supply circuit 1 comprises a first pair of terminals HV+, HV− and a second pair of terminals LV+, LV−.

The first battery 40 is connected in parallel to the first pair of terminals HV+, HV−.

The first load 45 is connected in parallel to the first battery 40.

The second battery 41 is connected in parallel to the second pair of terminals LV+, LV−.

The second load 46 is connected in parallel to the second battery 41.

The power supply circuit 1 is for example a direct-direct voltage converter (DC-DC) or (with the appropriate circuit changes) an alternate-direct voltage converter (AC-DC) or direct-alternate voltage converter (DC-AC).

For the purpose of explaining the invention, the power supply circuit 1 is subsequently considered to be a DC-DC voltage converter, but the following considerations can be made similarly for other types of power supply circuits.

The DC-DC converter 1 converts voltage between two levels of different direct current voltage, indicated with first level of direct voltage ΔHV (also referred to as "high voltage") and with second level of direct voltage ΔLV (also referred to as "low voltage").

In addition, the converter DC-DC 1 is bidirectional, i.e., it is able to perform:

a conversion from the level of high direct voltage ΔHV to the low direct voltage level ΔLV (indicated with "buck" mode), then the first pair of terminals HV+, HV− are input terminals and the second pair of terminals LV+, LV− are output terminals;

a conversion from the level of low direct voltage ΔLV to the level of high direct voltage ΔHV (indicated with "boost" mode), then the first pair of terminals LV+, LV− are input terminals and the second pair of terminals HV+, HV− are output terminals.

In this case the first battery 40 is a high voltage battery (e.g., 400 V) connected in parallel to the input/output terminals HV+, HV− of the DC-DC converter 1, the second battery 41 is a low voltage battery (e.g., 12 V) connected in parallel to the input/output terminals LV+, LV− of the DC-DC converter 1, the first load 45 is a high voltage load (e.g., an electric motor of a vehicle with electric or hybrid electric/thermal propulsion) and the second load 46 is a low voltage load (e.g., the electrical utilities in the electric or hybrid vehicle passenger compartment).

The DC-DC converter 1 comprises a switch 1-1 having the function of electrically connecting or disconnecting the internal components of the DC-DC converter 1 to/from the first terminal HV+ connected to the high voltage battery 40.

In particular, the switch 1-1 has the function of electrically connecting/disconnecting the DC-DC converter 1 to/from the high voltage battery 40, as a function of the value of a first switching signal S1_$sw$, by connecting/disconnecting the internal components of the DC-DC converter 1 to/from the first terminal HV+.

Furthermore, the DC-DC converter 1 comprises a further switch 1-2 (see FIG. 1B) having the function of electrically connecting or disconnecting the internal components of the DC-DC converter 1 to/from the low voltage terminal LV+ connected to the low voltage battery 41.

In particular, the further switch 1-2 has the function of electrically connecting/disconnecting the DC-DC converter 1 to/from the low voltage battery 40, as a function of the value of a further switching signal S2_$sw$, by connecting/disconnecting the internal components of the DC-DC converter 1 to/from the second terminal LV+.

The current sensor 3 is connected to the DC-DC converter 1 and to the protection circuit 2 and it has the function of detecting the current flowing in input and/or in output to/from the DC-DC converter 1, in particular the current I_HV+ flowing in input and/or in output to/from the first terminal HV+.

In particular, the current sensor 3 comprises an input terminal electrically connected to the DC-DC converter 1 and adapted to receive a current detection signal I_HV_dt_in which depends on the current I_HV+ at the input of the first terminal HV+.

The current sensor 3 further comprises an output terminal electrically connected to the protection circuit 2 and adapted to generate a current measurement signal S1_$ms$ (voltage or current type) representative of the measurement of the current I_HV+ flowing in input to the first terminal HV+ of the DC-DC converter 1.

The current sensor 3 is implemented for example with an operating amplifier circuit.

Note that the current sensor 3 is shown externally to the DC-DC converter 1, but the current sensor 3 may also be integrated therein.

The protection circuit 2 has the function of detecting a sudden variation over time of the current I_HV+ flowing in input and/or in output to/from the first terminal HV+ of the DC-DC converter 1, so as to detect the presence of a sudden variation in the input and/or output current I_HV+ and disconnect the DC-DC converter 1 from the side where the sudden variation in current has been detected, so as to avoid damaging the DC-DC converter 1. Note that the DC-DC converter 1 can remain disconnected from the side where the sudden variation in current has been detected for a certain period of time and is then automatically connected again to the same side; in this case the time interval during which the DC-DC converter 1 remains disconnected is used to identify and resolve the cause of the sudden variation in current, without however any guarantee that the fault has actually been resolved.

Alternatively, the DC-DC converter 1 remains disconnected until the cause of the sudden variation in current at the input or at the output of the DC-DC converter 1 has actually been resolved.

The term "sudden variation" over time of the input current I_HV+ or I_LV+ means that its trend at a given moment has a high slope (that is, an overly rapid variation in the input current), such as a rising or falling edge of the input current I_HV+ or I_LV+.

This situation can occur, for example, in the following cases:

several electrical/electronic devices are switched on at the same time;
 the low voltage battery 41 or the high voltage battery 40 is activated;
 a fault in the low voltage battery 41 or the high voltage battery 40 occurs;
 a fault occurs in an electrical component powered by the low voltage battery 41.

Figure 2:
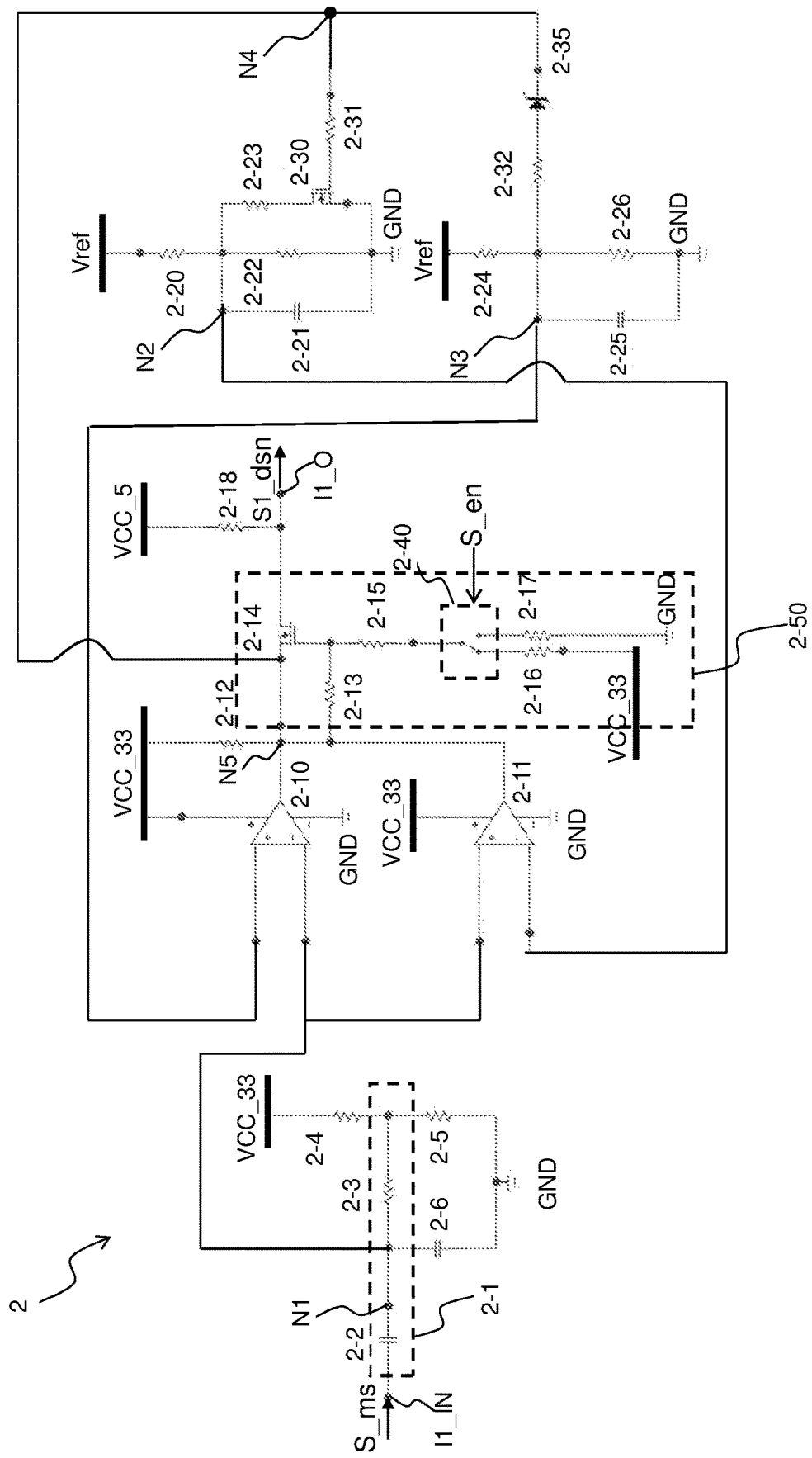
FIG. 2 shows an electronic protection circuit included in the power supply system of FIGS. 1A and 1B.

With reference to FIG. 2, the protection circuit 2 is shown in greater detail.

The protection circuit 2 comprises an input terminal I1_IN adapted to receive (from the current sensor 3) the current measurement signal S1_$ms$ representative of the measurement of the current I_HV+ at the input of the first voltage terminal HV+ of the DC-DC converter 1.

The protection circuit 2 further comprises a differentiator 2-1 configured to measure the slope of the current I_HV+ flowing in input to the first terminal HV+ of the DC-DC converter 1 and configured to detect if the value of the measured slope is greater than or less than a threshold value; in particular, said measurement of the slope of the input current I_HV+ is carried out by means of a differentiation operation of the current measurement signal S1_$ms$ generated by the current sensor 3.

Lastly, the protection circuit 2 comprises an output terminal I1_O adapted to generate a disconnection signal S1_$dsn$ having a first value (e.g., a high logic value) representative of an electrical disconnection of the power supply circuit 1 from the battery 40 and having a second value (e.g., a low logic value) representative of an electrical connection of the power supply circuit 1 to the battery 40.

In particular, the disconnection signal S1_$dsn$ is received at the control terminal of a switch 1-1 inside the DC-DC converter 1, which alternatively connects the DC-DC converter 1 to the high voltage battery 40 by means of the first terminal HV+ or disconnects the DC-DC converter 1 from the high voltage battery 40.

Therefore, when an excessively rapid variation in the slope of the current I_HV+ at the input of the first terminal HV+ of the DC-DC converter 1 is detected (by means of the sensor 3 and the protection circuit 2), the DC-DC converter 1 is electrically disconnected from the first battery 40 by disconnecting the internal components of the DC-DC converter 1 from the first terminal HV+, in order to avoid damaging the DC-DC converter 1; when instead a non-rapid (i.e., gradual) variation in the slope of the current I_HV+ at the input of the first terminal HV+ of the DC-DC converter 1 is detected (by means of the sensor 3 and the protection circuit 2), the electrical connection of the DC-DC converter 1 to the first battery 40 is maintained by means of the connection of the internal components of the DC-DC converter 1 to the first terminal HV+.

Advantageously, the differentiator 2-1 is an RC circuit, i.e., it comprises a capacitor 2-2 connected in series to a resistor 2-3.

In particular, the capacitor 2-2 has a first terminal connected to the input terminal I1_IN of the protection circuit 2 (and thus the first terminal of the capacitor 2-2 is connected to the output terminal of the current sensor 3) and the resistor 2-3 has a first terminal connected to a second terminal of the capacitor 2-2.

For example, the capacitor 2-2 has a capacity C14=15 nF [nf=nanofarad] and the resistor 2-3 has a resistance R34=47 kΩ [kΩ=kilo Ohm].

Advantageously, the protection circuit 2 further comprises a voltage divider having the function of shifting the central voltage, so as to allow sudden variations to be detected in both directions of the power supply circuit 1, i.e., both sudden variations in the current at the input of the first terminal HV+ and exiting from the first terminal HV+, and sudden variations in the current at the input of the second terminal LV+ and exiting from the second terminal LV+.

The voltage divider comprises a resistor 2-4 connected between the second terminal of the resistor 2-3 and a first reference voltage VCC_33 (e.g., equal to 3.3 V) and comprises a resistor 2-5 connected between the second terminal of the resistor 2-3 and a low reference voltage GND lower than the first reference voltage VCC33 (e.g., the low reference voltage GND is the ground reference voltage).

The voltage divider is configured to generate a divided voltage on the second terminal of the resistor 2-3, equal for example to 1.65 Volts, in case the voltage divider is supplied by the first reference voltage VDC_33 equal to 3.3 Volts.

For example, the resistor 2-4 has a resistance R664=2.2 kΩ and the resistor 2-5 has a resistance R665=2.2 kn.

Preferably, the protection circuit 2 further comprises a capacitor 2-6 connected between the node N1 which is common to the capacitor 2-3 and the resistor 2-3 and the ground reference voltage.

For example, the capacitor 2-6 has a capacity C110=220 pF [pf=picofarad]. The protection circuit 2 further comprises a driving stage interposed between the node N1 which is common to the capacitor 2-3 and the resistor 2-3 and the output terminal I1_O of the protection circuit 2.

The driving stage has the function of detecting the presence of a sudden variation in the current at the input of the DC-DC converter 1 in both directions, i.e., both a sudden variation from the current I_HV+ at the input of the first terminal HV+ and exiting from the first terminal HV+ when the DC-DC converter 1 operates in buck mode, and a sudden variation from the current I_LV+ at the input of the second terminal LV+ and exiting from the second terminal LV+ when the DC-DC converter 1 operates in boost mode.

The driving stage comprises a first comparator 2-10, a second comparator 2-11, a resistor 2-12, a resistor 2-18, a resistor 2-22, a capacitor 2-21, a resistor 2-26, a capacitor 2-25, a resistor 2-20, a resistor 2-24, a resistor 2-23, a resistor 2-32, a MOSFET transistor 2-30, a resistor 2-31 and a Zener diode 2-35, which are connected together as shown in FIG. 2.

The set of the first comparator 2-10, of the second comparator 2-11 and of the resistor 2-12 have the function of determining the voltage value on the node N5 which is in common in output from the first and the second comparators 2-10, 2-11.

In particular, the first comparator 2-10 is powered by the first supply voltage VCC_33, it comprises two input terminals (a positive and a negative terminal) and an output terminal and it operates as a voltage comparator, i.e., the first comparator 2-10 generates at the output terminal a high logic value when the voltage value of the positive input terminal is greater than the voltage value of the negative input terminal, while the first comparator 2-10 generates at the output terminal a low logic value when the voltage value of the positive input terminal is less than the voltage value of the negative input terminal.

The second comparator 2-11 has an operation analogous to that of the first comparator 2-10, i.e., the second comparator 2-11 generates at the output terminal a high logic value when the voltage value of the positive input terminal is greater than the voltage value of the negative input terminal, while the second comparator 2-11 generates at the output terminal a low logic value when the voltage value of the positive input terminal is less than the voltage value of the negative input terminal.

The comparators 2-10, 2-11 are implemented with respective integrated circuits, such as the integrated circuits identified with LM339, LM239, LM139, LM2901 sold by Texas Instruments.

The driving stage further comprises:
- a first parallel connection of a capacitor 2-21 and of a resistor 2-22;
- a second parallel connection of a capacitor 2-25 and of a resistor 2-26;
- a resistor 2-20 connected between the first parallel connection and a reference voltage Vref;
- a resistor 2-24 connected between the reference voltage Vref and the second parallel connection;
- a series connection of a resistor 2-23 and of a switch 2-30, the switch 2-30 comprising a control terminal connected to the node N4 and adapted to control the opening and closing of the switch 2-30;
- a resistor 2-31 connected between the control terminal of the switch 2-30 and the common node N4.

The set of the capacitor 2-21, resistor 2-22, capacitor 2-25, resistor 2-26, resistor 2-20, resistor 2-24, resistor 2-23, resistor 2-32, MOSFET transistor 2-30, resistor 2-31 and Zener diode 2-35, have the function of determining the levels of intervention of the protection against sudden variations in the current at the input/output of the power supply circuit 1 and the threshold values of the hysteresis which avoids oscillations between the activation and the deactivation of the protection circuit 2, thus reducing the probability of oscillations between the disconnection of the power supply circuit and the connection of the power supply circuit.

The positive terminal of the second comparator 2-11 is connected to the negative terminal of the first comparator 2-10 and it is also connected to the node N1 which is common to the capacitor 2-2 and to the first resistor 2-3.

The positive terminal of the first comparator 2-10 is connected to a node N3 which is common to the first terminal of the capacitor 2-25, to the first terminal of the resistor 2-26, to the first terminal of the resistor 2-24 and to the first terminal of the resistor 2-32.

The negative terminal of the second comparator 2-11 is connected to a node N2 which is common to the first terminal of the capacitor 2-21, to the first terminal of the resistor 2-22, to the first terminal of the resistor 2-20 and to the first terminal of the resistor 2-23.

The resistor 2-12 is connected between the output terminal of the first comparator 2-10 and the first supply voltage VCC_33.

The series connection (of the resistor 2-23 and of the switch 2-30) is connected in parallel to the first parallel connection (of the capacitor 2-21 and of the resistor 2-22), i.e.:

the resistor 2-23 comprises a first terminal connected to a node N2 which is common to the first terminal of the capacitor 2-12, to the first terminal of the resistor 2-22 and to the first terminal of the resistor 2-20;

the resistor 2-23 comprises a second terminal connected to a first terminal of the switch 2-30;

the switch 2-30 comprises a second terminal connected to the second terminal of the capacitor 2-12 and to the second terminal of the resistor 2-22, i.e., to the ground reference voltage.

Figure 1B:
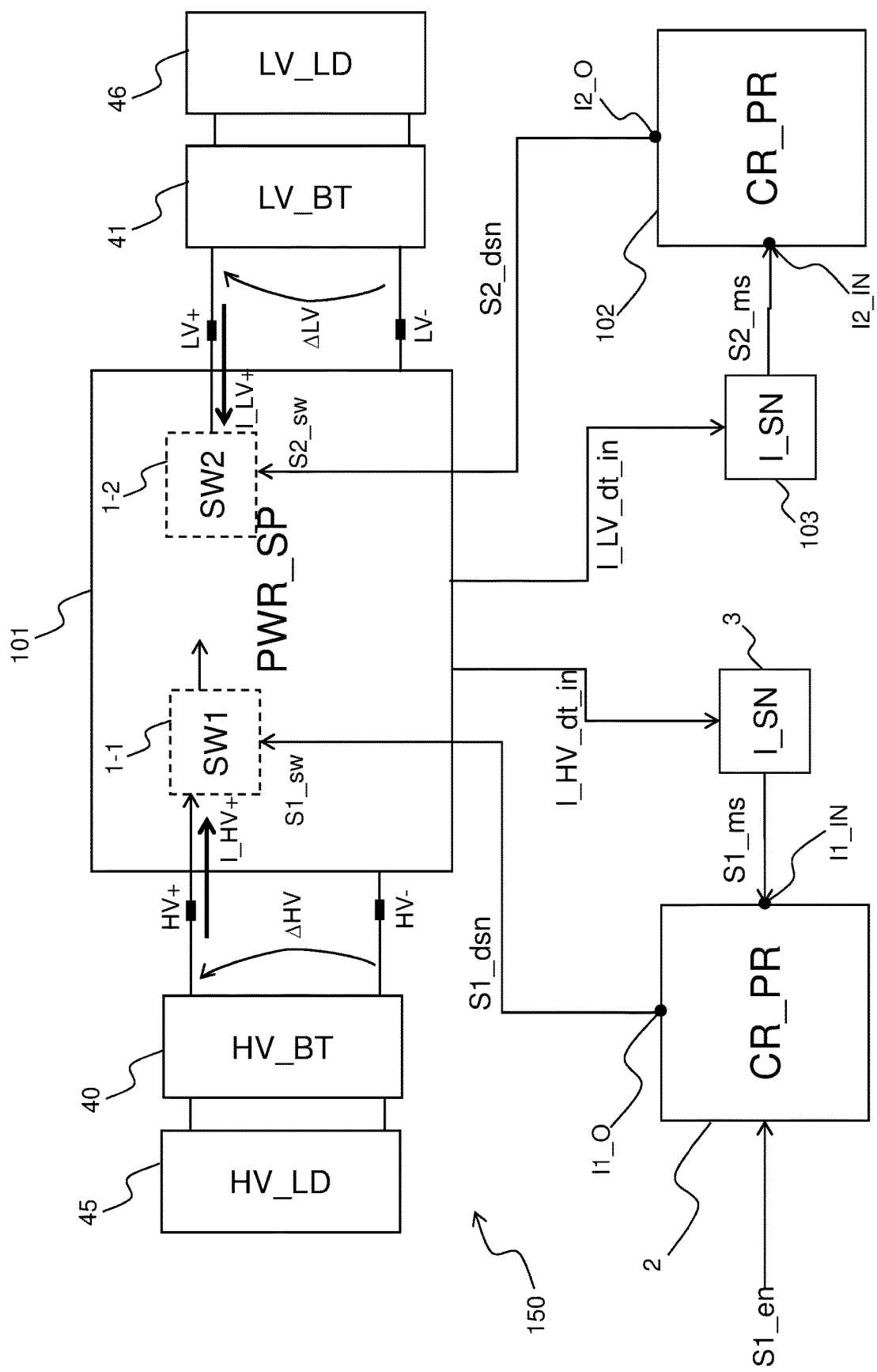
FIG. 1B shows a block diagram of a power supply system according to a second embodiment of the invention.

With reference to FIG. 1B, it shows a block diagram of a power supply system 150 based on a second embodiment of the invention.

The second embodiment of FIG. 1B differs from the first embodiment of FIG. 1A in that it comprises a further protection circuit 102, a further current sensor 103 and a further switch 1-2 in the DC-DC converter 101, in order to further detect the current I_LV+ flowing in input and/or in output to/from the second terminal LV+.

Note that for the sake of simplicity, FIG. 1B shows two different protection circuits 2, 102, but the invention can also be made using a single protection circuit which performs both the protection functions of the circuits 2 and 102.

Therefore the current sensor 103 of the second embodiment of FIG. 1B has a function analogous to the current sensor 3 of the first embodiment of FIG. 1A, with the difference that the current sensor 103 has the function of detecting the current I_LV+ flowing in input and/or in output to/from the second terminal LV+, thereby generating a further current measurement signal S2_ms (voltage or current type) representative of the measurement of the current I_LV+ flowing in input to the second terminal LV+.

Furthermore, the protection circuit 102 of the second embodiment of FIG. 1B has a function analogous to the protection circuit 2 of the first embodiment of FIG. 1A, with the difference that the protection circuit 102 has the function of detecting a sudden variation over time of the current I_LV+ flowing in input and/or in output to/from the second terminal LV+.

Finally the switch 1-2 has the function of electrically connecting or disconnecting the internal components of the DC-DC converter 1 to/from the second terminal HV+ connected to the low voltage battery 41.

Therefore, the foregoing considerations relating to the first terminal HV+ may also be made analogous to the second terminal LV+, i.e., the input terminal I2_IN of the protection circuit 102 is adapted to receive a further current measurement signal S2_ms representative of the measurement of the current I_LV+ at the input of the second terminal LV+ of the DC-DC converter 1.

In this second embodiment the differentiator 2-1 of the protection circuit 102 is configured to measure the slope of the current I_LV+ at the input of the second terminal LV+ of the DC-DC converter 1 and it is configured to detect if the measured slope value is greater or less than a further threshold value.

Lastly, the protection circuit 102 comprises an output terminal I2_O adapted to generate a further disconnection signal S2_dsn having a first value (e.g., a high logic value) representative of an electrical disconnection of the power supply circuit 1 from the battery 41 and having a second value (e.g., a low logic value) representative of an electrical connection of the power supply circuit 1 to the battery 41.

Therefore, when in the second embodiment an excessively rapid variation in the slope of the current I_LV+ at the input of the terminal LV+ of the DC-DC converter 1 is detected (by means of the sensor 103 and the protection circuit 102), the DC-DC converter 1 is electrically disconnected from the second battery 41 by disconnecting the internal components of the DC-DC converter 1 from the input terminal LV+, in order to avoid damaging the DC-DC converter 1; when instead in the second embodiment a non-rapid (i.e., gradual) variation in the slope of the current I_LV+ at the input of the terminal LV+ of the DC-DC converter 1 is detected (by means of the sensor 103 and the protection circuit 102), the electrical connection of the DC-DC converter 1 to the second battery 41 is maintained by means of the connection of the internal components of the DC-DC converter 1 to the input terminal LV+.

Below are the possible values of the resistances and capacities of the components of the driving stage of the protection circuit 2 of the first embodiment:

resistor 2-12: resistance R663=1.0 kΩ;
resistor 2-20: resistance R654=2.0 kΩ;
capacitor 2-21: capacity C108=1.0 nF;
resistor 2-22: resistance R656=13 kΩ;
resistor 2-24: resistance R639=6.8 kΩ;
capacitor 2-25: capacity C107=1.0 nF;
resistor 2-26: resistance R640=15 kΩ;
resistor 2-31: resistance R657=10 kΩ;
resistor 2-32: resistance R658=20 kΩ;
resistor 2-23: resistance R656=13 kΩ;

Preferably, the protection circuit 2 further comprises an enable stage 2-50 having the function of enabling or disabling the operation of the protection circuit 2, as a function of the value of an enable signal S_en, which is generated by an external control unit (e.g., a microprocessor), The enable stage 2-50 is interposed between the driving stage of the protection circuit 2 and the output terminal I1_O of the protection circuit 2.

The enable stage 2-50 comprises a switch 2-14, a resistor 2-13, a resistor 2-15, a switch 2-40, a resistor 2-16, and a resistor 2-17.

The switch 2-14 is interposed between the terminal which is common to the output of the first and second comparators 2-10, 2-11 and the output terminal I1_O of the protection circuit 2; in addition, the switch 2-14 comprises a control terminal adapted to control the opening and closing of the switch 2-14.

The control terminal is connected to a terminal which is common to the resistors 2-13 and 2-15.

The switch 2-14 is implemented for example with a MOSFET transistor.

The resistor 2-13 is connected between the terminal which is common to the output of the first and second comparators 2-10, 2-11 and the control terminal of the switch 2-14.

The resistor 2-15 is connected between the control terminal of the switch 2-14 and the switch 2-40.

The switch 2-40 is connected between the resistor 2-15 and the resistors 2-16, 2-17.

The resistor 2-16 is connected between the switch 2-40 and the first reference voltage VCC_33.

The resistor 2-17 is connected between the switch 2-40 and the low reference voltage GND.

The switch 2-40 comprises a first, a second and a third terminal and comprises a control terminal adapted to receive the enable signal S_en in order to connect, alternatively, the first terminal to the second or to the third terminal.

The switch 2-40 is such to switch between the following two possible positions, as a function of the value of the enable signal S_en:

a first position in which the resistor 2-15 is connected to the resistor 2-16: in this position the operation of the protection circuit 2 is enabled, i.e., the enable stage 2-50 is such to detect a sudden variation in the current I_HV+, I_LV+ at the input of the DC-DC converter 1, in order to electrically disconnect the DC-DC converter 1 from the high voltage battery 40 and the low voltage battery 41, respectively, as illustrated above;

a second position in which the resistor 2-15 is connected to the resistor 2-17: in this position the operation of the protection circuit 2 is disabled, i.e., the enable stage 2-50 is such not to detect a sudden variation in the current I_HV+, I_LV+ at the input of the DC-DC converter 1.

The resistor 2-16 is connected between the second terminal of the switch 2-40 and the first supply voltage VCC_33.

The resistor 2-17 is connected between the third terminal of the switch 2-40 and the low reference voltage GND.

Below are the possible values of the resistances and capacities of the components of the enable stage of the protection circuit 1:

resistor 2-15: resistance R659=1.0 kΩ;
resistor 2-16: resistance R661=100 kΩ;
resistor 2-17: resistance R660=100 kΩ;
resistor 2-13: resistance R662=100 kΩ;

Preferably, the protection circuit further comprises a resistor 2-18 connected between the output terminal of the protection circuit and a second supply voltage VDC_5 greater than the first supply voltage VDC_33 (e.g., VDC_5=5 Volts and VDC_33=3.3 Volts).

The resistor 2-18 has for example a resistance R638=1.0 kn.

Figure 3:
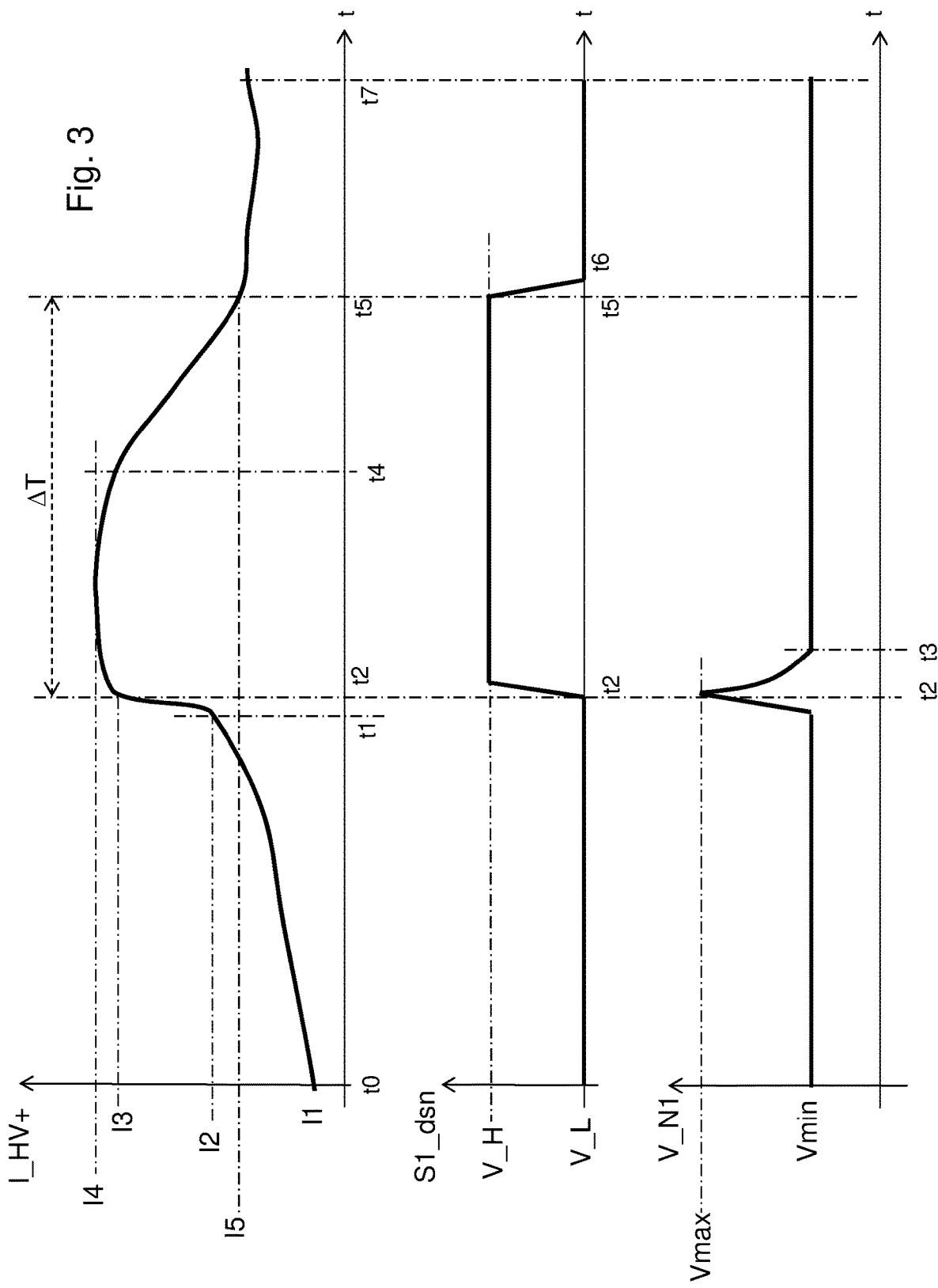
FIG. 3 schematically shows a possible trend of some signals used in the power supply system of FIGS. 1A and 1n the electronic protection circuit of FIG. 2.
Figure 4:
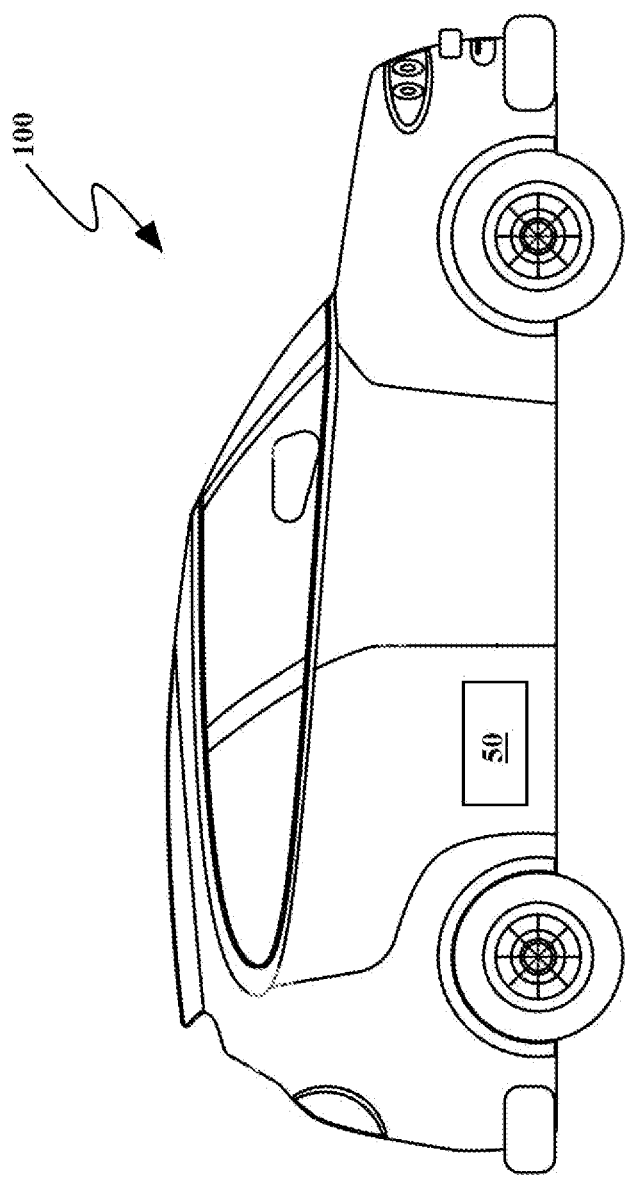
FIG. 4 schematically shows an electric vehicle provided with the power supply system of FIG. 1A.

With reference to FIG. 3, it shows schematically the trend over time of the current I_HV+ at the input of the DC-DC converter 1, of the current measurement signal S1_*ms* generated in output from the current sensor 3, of the disconnection signal S1_*dsn* generated in output from the protection circuit 2, in case a sudden variation in the input current I_HV+ occurs.

It is assumed that the DC-DC converter 1 is automatically reconnected after a defined time interval ΔT following the instant of detection of sudden variation in the current at the input of the first input terminal HV+ of the DC-DC converter 1; the defined time interval ΔT is calculated for example by means of a time counter inside the protection circuit 2.

It is possible to observe the following behaviour.

In the instants comprised between t0 and t1 the input current I_HV+ has a gradually increasing trend from a value I1 to a value I2, thus the disconnection signal S1_*dsn* has a low logic value V_L (for example, equal to 0 Volts) that maintains the DC-DC converter 1 connected to the high voltage battery 40 by means of the first input terminal HV+.

In addition, in the instants comprised between t0 and the voltage V_N1 of the node N1 has a minimum value Vmin which is small.

It should be noted that the difference between the I2 and I0 values of the input current I_HV+ may also be high, but the disconnection signal S1_*dsn* maintains the low logic value V_L, as there has been no sudden variation in the trend of the input current I_HV+, which instead has had a gradually increasing trend over time.

Instead in the instants comprised between t1 and t2 (t2 following t1) the input current I_HV+ has a sudden variation from the value I2 at the instant t1 to the value I3 at the instant t2, where I3 is much greater than I2 and where the time interval comprised between t1 and t2 is small: the cause of said sudden variation of the input current I_HV+ is for example a fault of the high voltage battery 40.

In this case, at the instant t2 the voltage V_N1 of the node N1 has a positive peak in the instants comprised between t1 and t2, with a maximum value Vmax greater than the minimum value Vmin.

The disconnection signal S1_*dsn* has a transition (between the instants t1 and t2) from the low logic value V_L to the high logic value V_H (e.g., equal to 5 V) which disconnects the DC-DC converter 1 from the battery 40 by disconnecting the internal components of the DC-DC converter 1 from the first input terminal HV+, thus avoiding damaging the DC-DC converter 1.

In the instants comprised between t2 and t4 the input current I_HV+ has a substantially constant trend, therefore the fault of the battery 40 is prevented from spreading on the high voltage side of the DC-DC converter 1.

In addition, in the instants comprised between t2 and t4, the disconnection signal S1_*dsn* maintains the high logic value which maintains the DC-DC converter 1 disconnected from the battery 40.

At the instant t4 the input current I_HV+ starts having a gradually decreasing trend, which continues until the instant t5 in which the input current I_HV+ reaches the value I5 lower than the value I3 of the instant t2 in which the sudden variation in input current occurred.

At the instant t5 the protection circuit 2 detects that the input current I_HV+ has returned to have a trend without sudden variations for a defined time interval ΔT (comprised between t2 and t5), during which it is possible to identify and possibly resolve the cause of the sudden variation of the input current.

Therefore, after the defined time interval ΔT has elapsed, the DC-DC converter 1 is automatically reconnected to the high voltage battery 40, which is assumed to no longer be affected by the fault.

The protection circuit 2 generates the disconnection signal S1_*dsn* which has a transition (between the instants t5 and t6) from the high logic value V_H to the low logic value V_L, which restores the electrical connection between the DC-DC converter 1 and the battery 40 by means of the first input terminal HV+.

In the instants comprised between t6 and t7 the input current I_HV+ has a substantially constant trend, therefore the disconnection signal S1_*dsn* maintains the low logic value which maintains the electrical connection between the DC-DC converter 1 and the battery 40 by means of the first input terminal HV+.

The invention claimed is:

1. A power supply system comprising:
a power supply circuit having a terminal having a voltage level;
a current sensor configured to generate a current measurement signal representative of a measurement of the current flowing through the terminal of the power supply circuit;
a protection circuit comprising:
an input terminal configured to receive the current measurement signal representative of the measurement of the current flowing through said terminal of the power supply circuit;
a differentiator configured to measure a slope of the current measurement signal;

a driving stage interposed between the differentiator and an output terminal of the protection circuit, the driving stage being configured to generate a disconnection signal carrying:
a first value representative of an electrical connection of internal components of the power supply circuit to its terminal, in case the measured value of the slope of the current signal flowing through said terminal of the power supply circuit is less than or equal to a threshold value; or
a second value representative of an electrical disconnection of the internal components of the power supply circuit from its terminal, in case the measured value of the slope of the current signal flowing through said terminal of the power supply circuit is greater than the threshold value;
said output terminal configured to output the disconnection signal;
wherein the power supply circuit is configured to receive the disconnection signal and, alternatively, to electrically connect the internal components thereof to its terminal or electrically disconnect the internal components thereof from its terminal, as a function of the value of the disconnection signal.

2. The power supply system according to claim 1, wherein the differentiator comprises a series connection of a first capacitor and of a first resistor, wherein:
the input terminal of the protection circuit is connected to a first terminal of the first capacitor;
the input of the driving stage is connected to a node which is common to the first capacitor and the first resistor.

3. The power supply system according to claim 2, wherein:
the first capacitor has the first terminal connected to the input terminal of the protection circuit;
the first resistor has a first terminal connected to a second terminal of the first capacitor;
the protection circuit further comprising a voltage divider configured to generate a divided voltage on a second terminal of the first resistor; and
wherein the driving stage is interposed between said node which is common to the second terminal of the first capacitor, to the first terminal of the first resistor, to the divided voltage node and the output terminal of the protection circuit.

4. The power supply system according to claim 3, wherein the voltage divider comprises:
a second resistor connected between the second terminal of the first resistor and a first supply voltage;
a third resistor connected between the second terminal of the first resistor and a low reference voltage that is less than the first supply voltage.

5. The power supply system according to claim 4, further comprising:
a first comparator and a second comparator comprising a respective positive input terminal, a respective negative input terminal and a respective output terminal configured to generate a respective signal of comparison between the value of a signal of the positive and negative input terminals, the first and second comparators being powered by a first supply voltage;
a fourth resistor;
a first parallel connection of a second capacitor and of a fifth resistor;
a second parallel connection of a third capacitor and of a sixth resistor;
a seventh resistor connected between the first parallel connection and a reference voltage;
an eighth resistor connected between the reference voltage and the second parallel connection;
a ninth resistor interposed between the first parallel connection and a common node;
a tenth resistor interposed between the second parallel connection and the common node;
a series connection of the ninth resistor and a second switch, said second switch comprising a control terminal connected to the common node and configured to control the opening and closing of the second switch;
a twelfth resistor connected between the control terminal of the second switch and the common node;
wherein:
the negative input terminal of the first comparator is connected to the positive input terminal of the second comparator and to the node which is common to the first capacitor and the first resistor;
the positive terminal of the first comparator is connected to the second parallel connection;
the negative terminal of the second comparator is connected to the first parallel connection;
the output terminal of the first comparator is connected to the output terminal of the second comparator;
the output terminal of the protection circuit is associated with a second node which is common to the output terminals of the first and second comparators;
the fourth resistor is connected between the second node which is common to the output terminals of the first and second comparators and the first supply voltage;
said series connection is connected in parallel to the first parallel connection.

6. The power supply system according to claim 5, further comprising an enable stage interposed between the driving stage and the output terminal of the protection circuit,
the enable stage being configured to enable or disable the operation of the protection circuit, as a function of the value of an enable signal, the enable stage comprising:
a third switch connected between the second node which is common to the output terminals of the first and second comparators and the output terminal of the protection circuit, the third switch comprising a control terminal for controlling the opening and closing of the third switch;
an eleventh resistor connected between the second node which is common to the output terminals of the first and second comparators and the control terminal of the third switch;
a fourth switch comprising a first, a second and a third terminal and comprising a control terminal configured to receive the enable signal in order to connect, alternatively, the first terminal to the second or third terminal, as a function of the value of the enable signal;
a sixteenth resistor connected between the control terminal of the third switch and the first terminal of the fourth switch;
a thirteenth resistor connected between the second terminal of the fourth switch and the first supply voltage;
a fourteenth resistor connected between the third terminal of the fourth switch and a low reference voltage; and
the power supply system further comprising a control unit configured to generate the enable signal in order to enable or disable the operation of the protection circuit.

7. The power supply system according to claim 4, wherein the power supply circuit comprises a switch configured to electrically connect/disconnect the internal components of the power supply circuit to/from its input terminal,
   the switch comprising a control terminal configured to receive the disconnection signal generated by the protection circuit, wherein the switch is configured to:
      electrically connect the internal components of the power supply circuit to its input terminal, in case the disconnection signal carries the first value representative of the electrical connection;
      electrically disconnect the internal components of the power supply circuit from the terminal thereof, in case the disconnection signal carries the second value representative of the electrical disconnection.

8. The power supply system according to claim 3, further comprising:
   a first comparator and a second comparator comprising a respective positive input terminal, a respective negative input terminal and a respective output terminal configured to generate a respective signal of comparison between the value of a signal of the positive and negative input terminals, the first and second comparators being powered by a first supply voltage;
   a fourth resistor;
   a first parallel connection of a second capacitor and of a fifth resistor;
   a second parallel connection of a third capacitor and of a sixth resistor;
   a seventh resistor connected between the first parallel connection and a reference voltage;
   an eighth resistor connected between the reference voltage and the second parallel connection;
   a ninth resistor interposed between the first parallel connection and a common node;
   a tenth resistor interposed between the second parallel connection and the common node;
   a series connection of said ninth resistor and a second switch, said second switch comprising a control terminal connected to the common node and configured to control the opening and closing of the second switch;
   a twelfth resistor connected between the control terminal of the second switch and the common node;
wherein:
   the negative input terminal of the first comparator is connected to the positive input terminal of the second comparator and to the node which is common to the first capacitor and the first resistor;
   the positive terminal of the first comparator is connected to the second parallel connection;
   the negative terminal of the second comparator is connected to the first parallel connection;
   the output terminal of the first comparator is connected to the output terminal of the second comparator;
   the output terminal of the protection circuit is associated with a second node which is common to the output terminals of the first and second comparators;
   the fourth resistor is connected between the second node which is common to the output terminals of the first and second comparators and the first supply voltage;
   said series connection is connected in parallel to the first parallel connection.

9. The power supply system according to claim 8, further comprising:
   an enable stage interposed between the driving stage and the output terminal of the protection circuit, wherein the enable stage is configured to enable or disable the operation of the protection circuit, as a function of the value of an enable signal,
   the enable stage comprising:
      a third switch connected between the second node which is common to the output terminals of the first and second comparators and the output terminal of the protection circuit, the third switch comprising a control terminal for controlling the opening and closing of the third switch;
      an eleventh resistor connected between the second node which is common to the output terminals of the first and second comparators and the control terminal of the third switch;
      a fourth switch comprising a first, a second and a third terminal and comprising a control terminal configured to receive the enable signal in order to connect, alternatively, the first terminal to the second or third terminal, as a function of the value of the enable signal;
      a sixteenth resistor connected between the control terminal of the third switch and the first terminal of the fourth switch;
      a thirteenth resistor connected between the second terminal of the fourth switch and the first supply voltage;
      a fourteenth resistor connected between the third terminal of the fourth switch and a low reference voltage; and
   a control unit configured to generate the enable signal in order to enable or disable the operation of the protection circuit.

10. The power supply system according to claim 3, wherein the power supply circuit comprises a switch configured to electrically connect/disconnect the internal components of the power supply circuit to/from its input terminal,
   the switch comprising a control terminal configured to receive the disconnection signal generated by the protection circuit,
   wherein the switch is configured to:
      electrically connect the internal components of the power supply circuit to its input terminal, in case the disconnection signal carries the first value representative of the electrical connection;
      electrically disconnect the internal components of the power supply circuit from the terminal thereof, in case the disconnection signal carries the second value representative of the electrical disconnection.

11. The power supply system according to claim 3, wherein the power supply circuit is a DC-DC voltage converter of the bidirectional type configured to convert said voltage level of the high voltage direct current type into a level of low voltage direct current, and vice versa,
   the converter comprising a first pair of input/output terminals configured to receive/generate the level of high voltage direct current and comprising a second pair of input/output terminals configured to receive/generate the level of low voltage direct current,
   the power supply system further comprising:
      a high voltage battery connected in parallel to the first pair of input/output terminals;
      a high voltage electric load connected in parallel to the high voltage battery;
      a low voltage battery connected in parallel to the second pair of input/output terminals;
      a low voltage electric load connected in parallel to the low voltage battery.

12. The power supply system according to claim 2, wherein the power supply circuit comprises a switch configured to electrically connect/disconnect the internal components of the power supply circuit to/from its input terminal, the switch comprising a control terminal configured to receive the disconnection signal generated by the protection circuit, wherein the switch is configured to:
  electrically connect the internal components of the power supply circuit to its input terminal, in case the disconnection signal carries the first value representative of the electrical connection;
  electrically disconnect the internal components of the power supply circuit from the terminal thereof, in case the disconnection signal carries the second value representative of the electrical disconnection.

13. The power supply system according to claim 2, wherein the power supply circuit is a DC-DC voltage converter of the bidirectional type configured to convert said voltage level of the high voltage direct current type into a level of low voltage direct current, and vice versa,
  the converter comprising a first pair of input/output terminals configured to receive/generate the level of high voltage direct current and a second pair of input/output terminals configured to receive/generate the level of low voltage direct current,
  the power supply system further comprising:
    a high voltage battery connected in parallel to the first pair of input/output terminals;
    a high voltage electric load connected in parallel to the high voltage battery;
    a low voltage battery connected in parallel to the second pair of input/output terminals;
    a low voltage electric load connected in parallel to the low voltage battery.

14. The power supply system according to claim 1, wherein the power supply circuit comprises a switch configured to electrically connect/disconnect the internal components of the power supply circuit to/from its input terminal,
  the switch comprising a control terminal configured to receive the disconnection signal generated by the protection circuit, wherein the switch is configured to:
    electrically connect the internal components of the power supply circuit to its input terminal, in case the disconnection signal carries the first value representative of the electrical connection;
    electrically disconnect the internal components of the power supply circuit from the terminal thereof, in case the disconnection signal carries the second value representative of the electrical disconnection.

15. The power supply system according to claim 14, further comprising:
  a first comparator and a second comparator comprising a respective positive input terminal, a respective negative input terminal and a respective output terminal configured to generate a respective signal of comparison between the value of a signal of the positive and negative input terminals, the first and second comparators being powered by a first supply voltage;
  a fourth resistor;
  a first parallel connection of a second capacitor and of a fifth resistor;
  a second parallel connection of a third capacitor and of a sixth resistor;
  a seventh resistor connected between the first parallel connection and a reference voltage;
  an eighth resistor connected between the reference voltage and the second parallel connection;
  a ninth resistor interposed between the first parallel connection and a common node;
  a tenth resistor interposed between the second parallel connection and the common node;
  a series connection of said ninth resistor and a second switch, said second switch comprising a control terminal connected to the common node and configured to control the opening and closing of the second switch;
  a twelfth resistor connected between the control terminal of the second switch and the common node;
wherein:
  the negative input terminal of the first comparator is connected to the positive input terminal of the second comparator and to the node which is common to the first capacitor and the first resistor;
  the positive terminal of the first comparator is connected to the second parallel connection;
  the negative terminal of the second comparator is connected to the first parallel connection;
  the output terminal of the first comparator is connected to the output terminal of the second comparator;
  the output terminal of the protection circuit is associated with a second node which is common to the output terminals of the first and second comparators;
  the fourth resistor is connected between the second node which is common to the output terminals of the first and second comparators and the first supply voltage;
said series connection is connected in parallel to the first parallel connection.

16. The power supply system according to claim 15, further comprising an enable stage interposed between the driving stage and the output terminal of the protection circuit,
  the enable stage being configured to enable or disable the operation of the protection circuit, as a function of the value of an enable signal, the enable stage comprising:
    a third switch connected between the second node which is common to the output terminals of the first and second comparators and the output terminal of the protection circuit, the third switch comprising a control terminal for controlling the opening and closing of the third switch;
    an eleventh resistor connected between the second node which is common to the output terminals of the first and second comparators and the control terminal of the third switch;
    a fourth switch comprising a first, a second and a third terminal and comprising a control terminal configured to receive the enable signal in order to connect, alternatively, the first terminal to the second or third terminal, as a function of the value of the enable signal;
    a sixteenth resistor connected between the control terminal of the third switch and the first terminal of the fourth switch;
    a thirteenth resistor connected between the second terminal of the fourth switch and the first supply voltage;
    a fourteenth resistor connected between the third terminal of the fourth switch and a low reference voltage;
  the power supply system further comprising a control unit configured to generate the enable signal in order to enable or disable the operation of the protection circuit.

17. The power supply system according to claim 1, further comprising a fifteenth resistor connected between the output terminal of the protection circuit and a second supply voltage that is greater than the first supply voltage.

18. The power supply system according to claim 1, wherein the power supply circuit is a DC-DC voltage converter of a bidirectional type configured to convert said voltage level of the high voltage direct current type into a level of low voltage direct current, and vice versa,
the converter comprising a first pair of input/output terminals configured to receive/generate the level of high voltage direct current and a second pair of input/output terminals configured to receive/generate the level of low voltage direct current;
the power supply system further comprising:
a high voltage battery connected in parallel to the first pair of input/output terminals;
a high voltage electric load connected in parallel to the high voltage battery;
a low voltage battery connected in parallel to the second pair of input/output terminals;
a low voltage electric load connected in parallel to the low voltage battery.

19. An electric vehicle or hybrid vehicle with an electric motor and internal combustion engine, comprising a power supply system comprising:
a power supply circuit having a terminal having a voltage level;
a current sensor configured to generate a current measurement signal representative of the measurement of the current flowing through the terminal of the power supply circuit;
a protection circuit comprising:
an input terminal configured to receive the current measurement signal representative of the measurement of the current flowing through said terminal of the power supply circuit;
a differentiator configured to measure the slope of the current measurement signal;
a driving stage interposed between the differentiator and an output terminal of the protection circuit, the driving stage being configured to generate a disconnection signal carrying:
a first value representative of an electrical connection of internal components of the power supply circuit to its terminal, in case the measured value of the slope of the current signal flowing through said terminal of the power supply circuit is less than or equal to a threshold value; or
a second value representative of an electrical disconnection of the internal components of the power supply circuit from its terminal, in case the measured value of the slope of the current signal flowing through said terminal of the power supply circuit is greater than the threshold value; and
said output terminal configured to output the disconnection signal;
wherein the power supply circuit is configured to receive the disconnection signal and, alternatively, to electrically connect the internal components thereof to its terminal or electrically disconnect the internal components thereof from its terminal, as a function of the value of the disconnection signal.

20. The electric vehicle or hybrid vehicle according to claim 19, wherein the differentiator comprises a series connection of a first capacitor and of a first resistor, wherein:
the input terminal of the protection circuit is connected to a first terminal of the first capacitor;
the input of the driving stage is connected to a node which is common to the first capacitor and the first resistor.

* * * * *